(12) United States Patent
Lee

(10) Patent No.: US 7,733,623 B2
(45) Date of Patent: Jun. 8, 2010

(54) STATIC ELECTRICITY PREVENTION APPARATUS WITH HANDLE COVER OF VEHICLE

(76) Inventor: Moon Koo Lee, 103-809, Yongsan Bosung Town., 937, Yongsan-dong, Dalseo-gu, Daegu (KR) 704-130

( * ) Notice: Subject to any disclaimer, the term of this patent is extended or adjusted under 35 U.S.C. 154(b) by 473 days.

(21) Appl. No.: 11/813,432

(22) PCT Filed: Jan. 3, 2006

(86) PCT No.: PCT/KR2006/000014
§ 371 (c)(1),
(2), (4) Date: Jul. 6, 2007

(87) PCT Pub. No.: WO2006/078098
PCT Pub. Date: Jul. 27, 2006

(65) Prior Publication Data
US 2009/0268365 A1    Oct. 29, 2009

(30) Foreign Application Priority Data
Jan. 18, 2005   (KR) ...................... 20-2005-0001475
Apr. 12, 2005   (KR) ...................... 20-2005-0010321

(51) Int. Cl.
*H02H 1/00* (2006.01)

(52) U.S. Cl. ..................................... 361/220; 361/212
(58) Field of Classification Search ................. 361/212, 361/220
See application file for complete search history.

(56) References Cited
FOREIGN PATENT DOCUMENTS
DE       19508521 A1  *  9/1996
DE       29718277 U1  *  1/1998

* cited by examiner

*Primary Examiner*—Danny Nguyen
(74) *Attorney, Agent, or Firm*—Ladas & Parry LLP

(57) ABSTRACT

In a static electricity prevention apparatus of a vehicle, there is provided a static electricity prevention apparatus provided at a vehicle handle cover which comprises a conductive contact means which is provided at a handle cover; a leading line which is provided at the conductive contact member; and a second leading line of which one end is connected through a leading line connection port provided at a front end of the leading line, and the other end is provided with a grounding piece which is connected with a fixing shaft of the handle, so that a shock phenomenon occurring an instant discharge of the static electricity accumulated in a driver's body can be prevented.

7 Claims, 6 Drawing Sheets

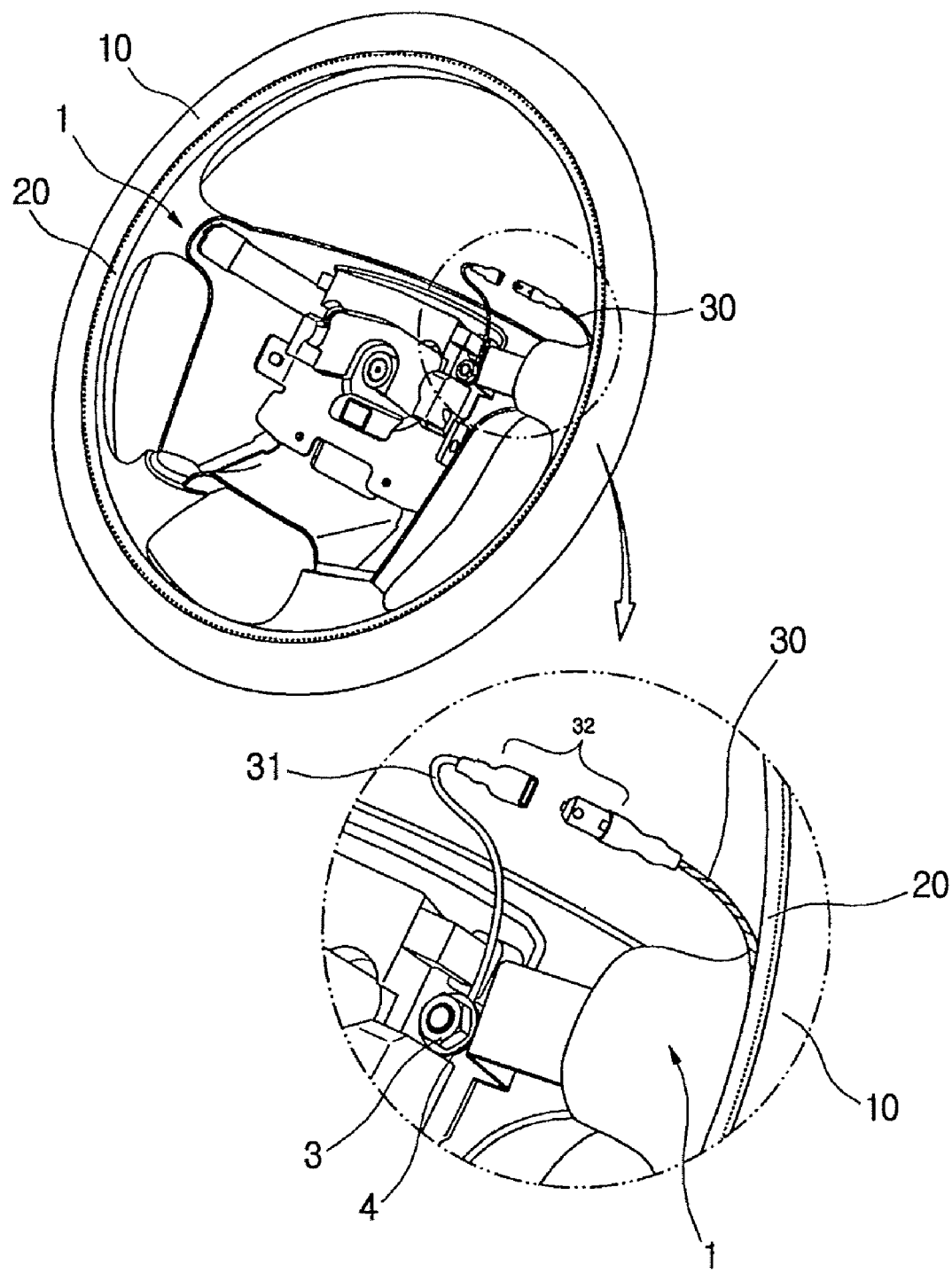
[Fig. 1]

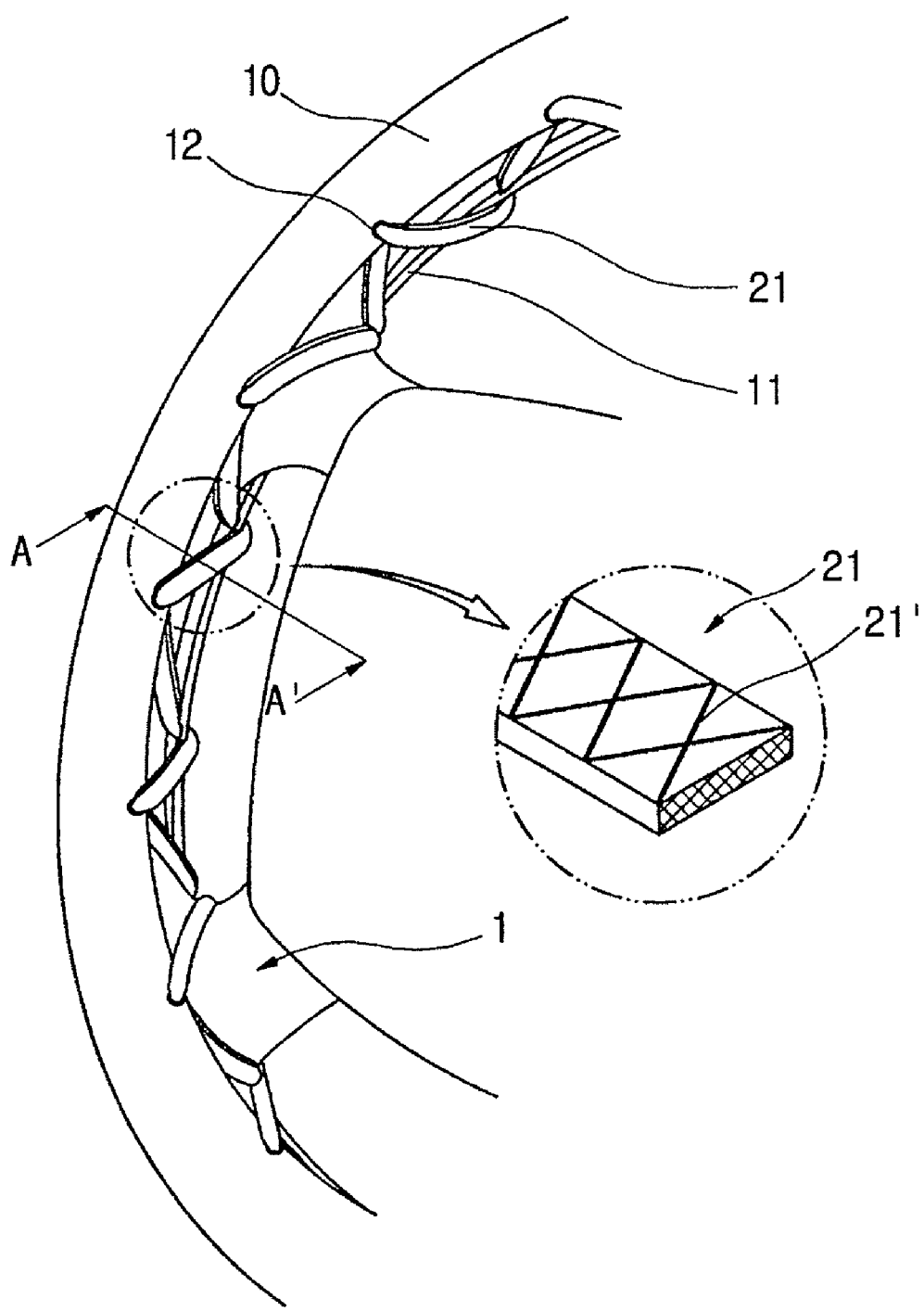
[Fig. 2]

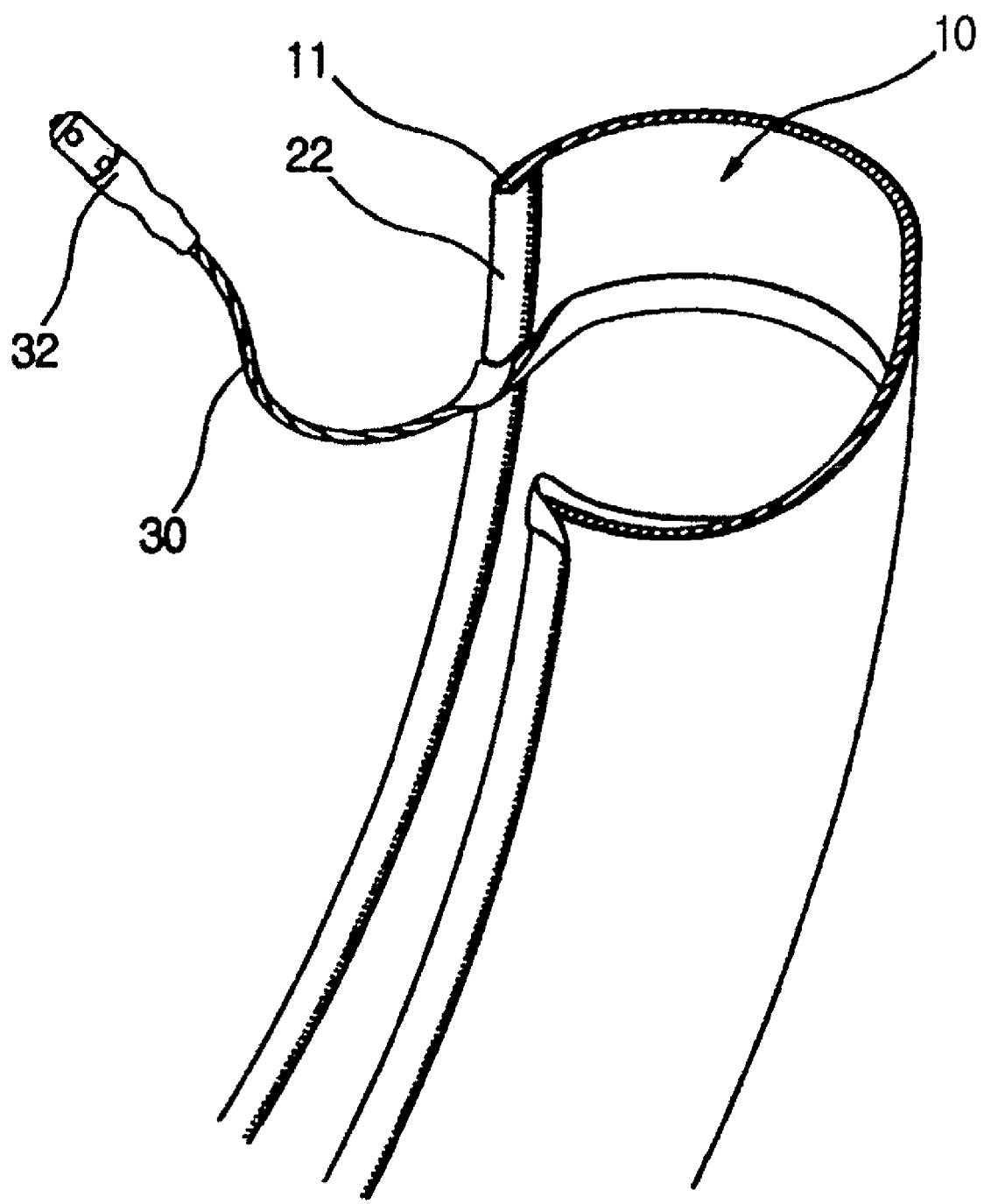
[Fig. 3]

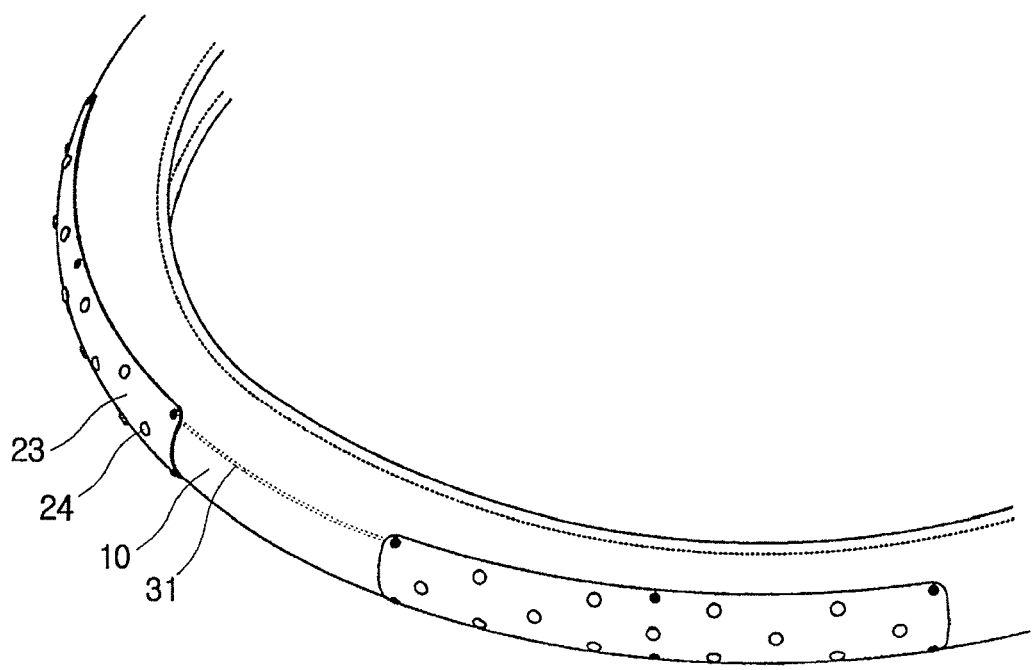
[Fig. 4]
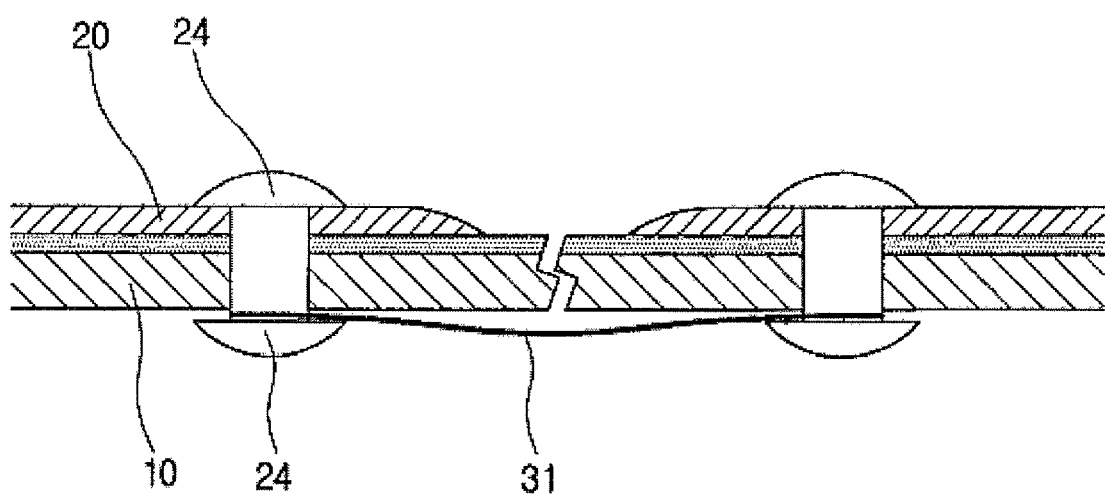
[Fig. 5]

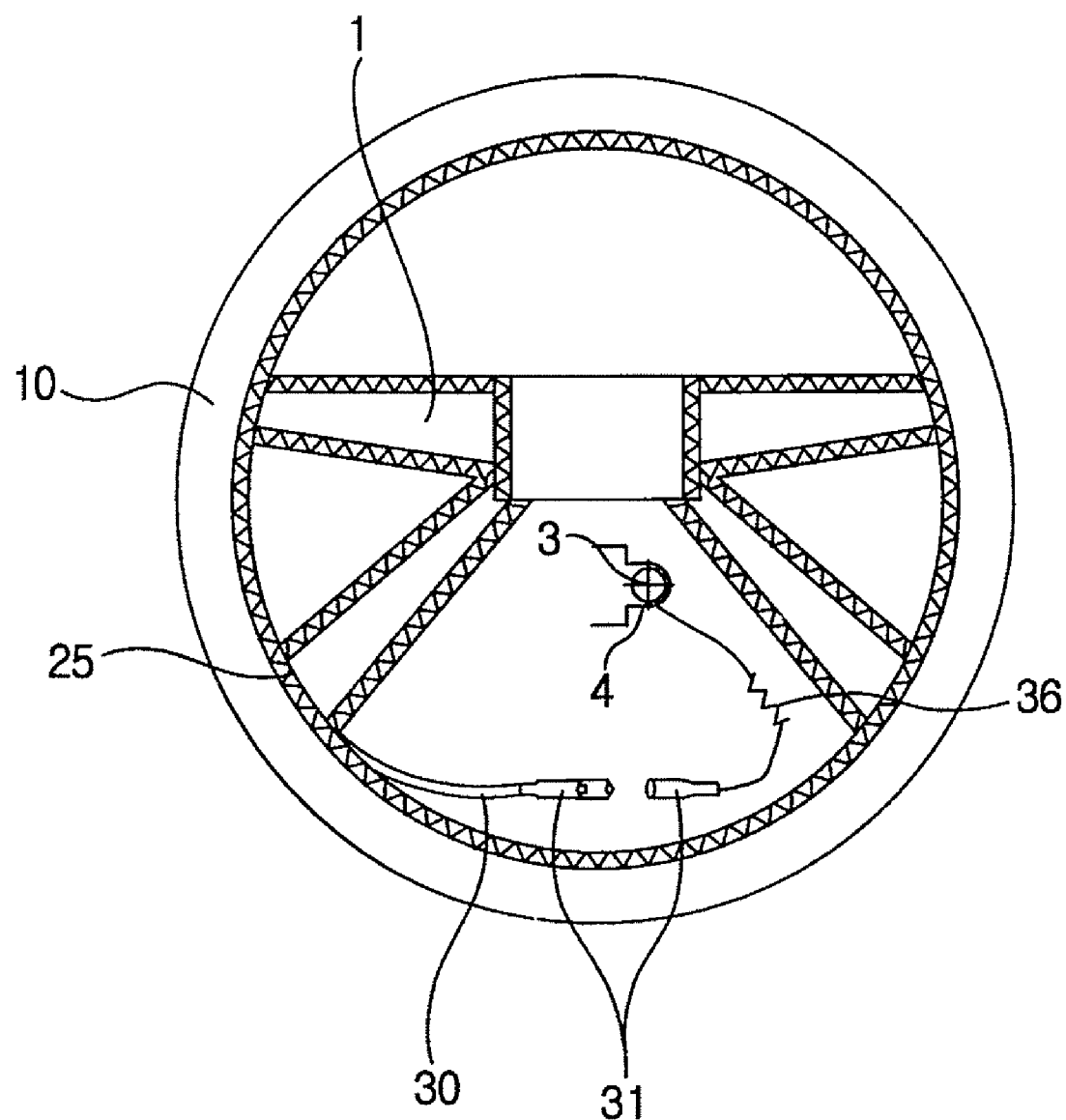
[Fig. 6]

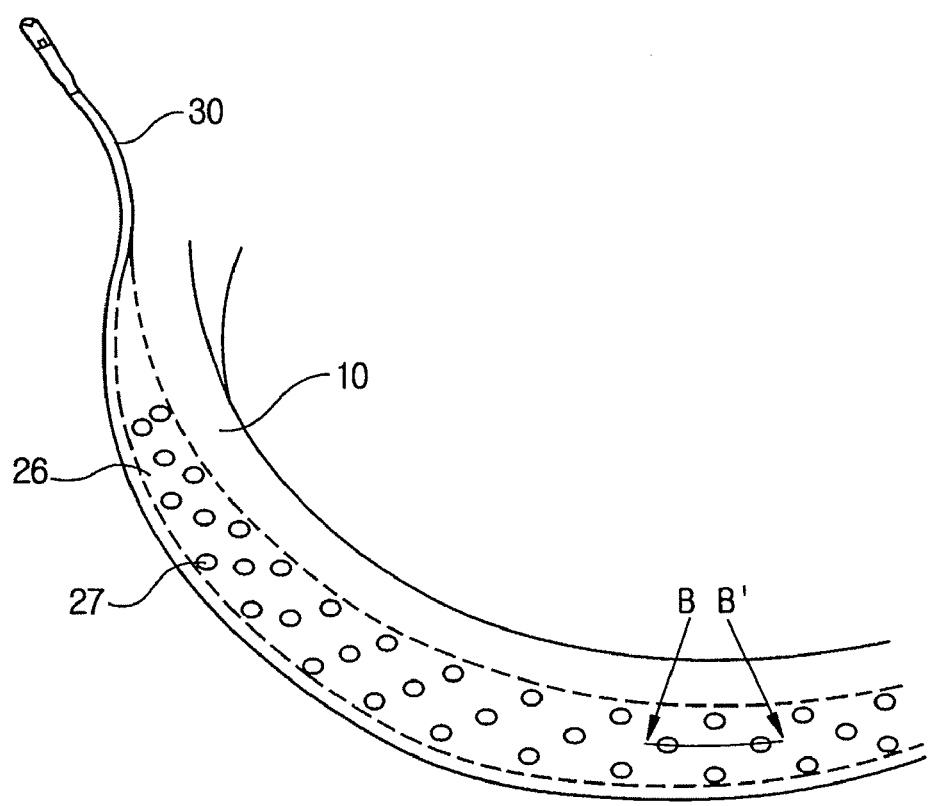
[Fig. 7]
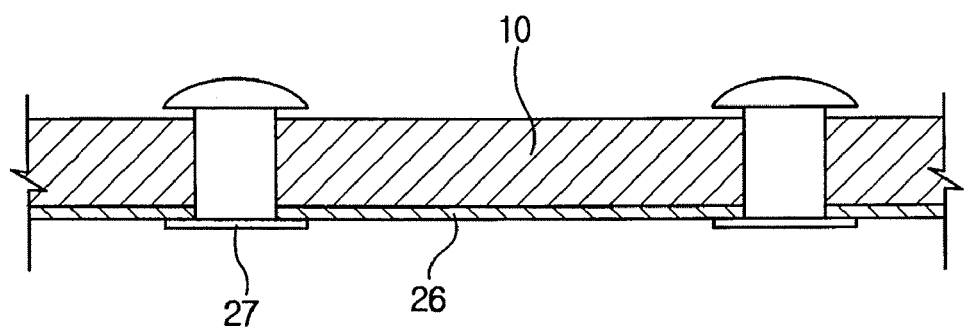
[Fig. 8]

STATIC ELECTRICITY PREVENTION APPARATUS WITH HANDLE COVER OF VEHICLE

TECHNICAL FIELD

The present invention relates to a static electricity prevention apparatus provided at a vehicle handle cover, and in particular to a static electricity prevention apparatus provided at a vehicle handle cover in which a static electricity occurring due to a friction between a driver and a seat when a driver gets on or off the vehicle is transmitted to a vehicle body through a handle cover for thereby preventing a shock phenomenon occurring when touching with others or objects due to a static electricity increased in a human body.

BACKGROUND ART

Generally, a static electricity occurs an electric charge separation and rearrangement due to a movement of a contact position by a friction. When a static electricity is discharged, a human body feels shock and uncomfortable. In addition, when the static electricity occurs at accurate electric circuits or parts, an error operation may occur.

The above static electricity may easily occur due to a friction between a driver's clothes and a vehicle seat when a driver gets on or off the vehicle and under a weather condition that humidity is below 50%.

So as to prevent the above static electricity, the conventional vehicle is designed to equip with an electric conduction-based vehicle seat. Namely, a conductive fiber is mixed into a seat for thereby removing a static electricity based on a magnetic discharging operation.

However, a method of mixing a conductive fiber into a vehicle seat is very difficult, so that the price of vehicle increases, and it is impossible to fully remove the remaining static electricity.

DISCLOSURE OF INVENTION

Accordingly, it is an object of the present invention to overcome the above problems.

It is another object of the present invention to provide a static electricity prevention apparatus in which a static electricity occurring due to a friction between a driver and a seat when a driver gets on or off the vehicle is transmitted to a vehicle body through a handle cover for thereby preventing a shock phenomenon occurring when touching with others or objects due to a static electricity increased in a human body.

It is further another object of the present invention to provide a static electricity prevention apparatus provided at a vehicle handle cover in which a static electricity continuously occurring due to a friction between a driver's seat and a driver's clothes when a driver drives a vehicle for a long time is transferred to a vehicle body, so that it is possible to prevent a uncomfortable feeling due to an electric charge of a static electricity accumulated in a human body and a danger situation that the separated electric charge may be discharged.

To achieve the above objects, in a static electricity prevention apparatus of a vehicle, there is provided a static electricity prevention apparatus provided at a vehicle handle cover which comprises a conductive contact means which is provided at a handle cover; a leading line which is provided at the conductive contact member; and a second leading line of which one end is connected through a leading line connection port provided at a front end of the leading line, and the other end is provided with a grounding piece which is connected with a fixing shaft of the handle, so that a shock phenomenon occurring an instant discharge of the static electricity accumulated in a driver's body can be prevented.

The conductive contact means includes a plurality of through holes provided at an edge portion of both ends of the handle cover, and a conductive strap engaged through the through holes.

The conductive contact means is constituted in such a manner that a conductive tape is sewed in which a conductive metallic thread is woven along an edge portion of both ends of the handle cover.

The conductive contact means in constituted in such a manner that a conductive metallic piece fixed based on a riveting method is arranged along an outer surface of the handle cover at regular intervals, and a rivet of both ends of the conductive metallic piece neighboring with the inner surface of the handle cover is connected by the connection leading line.

The conductive contact means is made of a conductive sewing thread when a soft or natural leather is covered when fabricating the handle, and the conductive thread is connected with a leading line.

The conducting contact means is fixed based on a riveting method based on a rivet at regular intervals as a conductive plate is attached along an inner surface of the handle cover.

The leading line or said second leading line is provided with resistors.

EFFECTS OF THE INVENTION

According to a static electric prevention apparatus provided at a vehicle handle cover according to the present invention, a static electricity occurring when a driver gets on or off a vehicle is transferred to a vehicle body through a handle cover having a conducting contact member, so that it is possible to prevent a shock phenomenon when touching with others or objects due to a static electricity increased in a human body.

In addition, a static electricity continuously occurring due to a friction between a driver's seat and a driver's clothes when a driver drives a vehicle for a long time is transferred to a vehicle body, so that it is possible to prevent an uncomfortable feeling and a potential danger due to an electric charge of a static electricity accumulated in a human body.

BRIEF DESCRIPTION OF THE DRAWINGS

FIG. 1 is a perspective view illustrating a schematic installation state of a static electricity prevention apparatus provided at a vehicle handle cover according to the present invention;

FIG. 2 is a perspective view illustrating a static electricity prevention apparatus provided at a vehicle handle cover according to a first embodiment of the present invention;

FIG. 3 is a perspective view illustrating a static electricity prevention apparatus provided at a vehicle handle cover according to a second embodiment of the present invention;

FIG. 4 is a perspective view illustrating a static electricity prevention apparatus provided at a vehicle handle cover according to a third embodiment of the present invention;

FIG. 5 is a cross sectional view taken along line A-A' of FIG. 4;

FIG. 6 is a perspective view illustrating a static electricity prevention apparatus provided at a vehicle handle cover according to a fourth embodiment of the present invention;

FIG. 7 is a perspective view illustrating a static electricity prevention apparatus provided at a vehicle handle cover according to a fifth embodiment of the present invention; and FIG. 8 is a cross sectional view taken along line B-B' of FIG. 7.

BEST MODE FOR CARRYING OUT THE INVENTION

The preferred embodiments of the present invention will be described with reference to the accompanying drawings.

FIG. 1 is a perspective view illustrating a schematic installation state of a static electricity prevention apparatus provided at a vehicle handle cover according to the present invention, FIG. 2 is a perspective view illustrating a static electricity prevention apparatus provided at a vehicle handle cover according to a first embodiment of the present invention, FIG. 3 is a perspective view illustrating a static electricity prevention apparatus provided at a vehicle handle cover according to a second embodiment of the present invention, FIG. 4 is a perspective view illustrating a static electricity prevention apparatus provided at a vehicle handle cover according to a third embodiment of the present invention, FIG. 5 is a cross sectional view taken along line A-A' of FIG. 4, FIG. 6 is a perspective view illustrating a static electricity prevention apparatus provided at a vehicle handle cover according to a fourth embodiment of the present invention, FIG. 7 is a perspective view illustrating a static electricity prevention apparatus provided at a vehicle handle cover according to a fifth embodiment of the present invention, and FIG. 8 is a cross sectional view taken along line B-B' of FIG. 7.

As shown in FIG. 1, the static electricity prevention apparatus provided at a vehicle handle cover according to the present invention includes a conductive contact member 20 provided at an outer side of a handle cover 10 which covers a handle which is a steering device of a vehicle, a leading line 30 which is connected with the conductive contact member 20 and has a certain length, and a second leading line 31' of which one end is connected through a leading line connection port 32 provided at a front end of the leading line, so that a ground piece 4 provided at the other end of the same is connected with a vehicle by a bolt 3 of a handle fixing shaft.

As shown in FIG. 2, in the static electricity prevention apparatus provided at a vehicle handle cover according to a first embodiment of the present invention, a plurality of through holes 12 are formed along an edge portion 11 of both ends of a handle cover 10 in diagonal directions. A wide conductive strap 21 passes through the through hole 12 using the conductive contact member 20. One end of the leading line 30 is connected with the conductive strap 21, and the other end of the same is connected with the bolt 3 of the fixing shaft of the handle 1 through the second leading line 31' connected with the conductive connection port 32 and the ground piece 4.

Here, the conductive strap 21 is made in such a manner that a conductive thread 21' is combined with a synthetic fiber or a cotton thread.

As shown in FIG. 3, in the static electricity prevention apparatus provided at a vehicle handle cover according to a second embodiment of the present invention, there is provided a conductive contact member 20 which is made in such a manner that a conductive woven tape 22 having a conductive metallic thread therein is sewed along the edge 11 of both ends of a common handle cover 10 made of common materials such as a rubber material, an elastic urethane material, a leather, an artificial leather, a woven material, etc. The static electricity is prevented using a conductive metallic thread embedded in the conductive woven tape 22. The connection and grounding methods with the leading line 30 are the same as the first embodiment of the present invention.

As shown in FIGS. 4 and 5, in the static electricity prevention apparatus provided at a vehicle handle cover according to a third embodiment of the present invention, a plurality of conductive metallic pieces 23 are provided along an outer surface of the handle cover 10 at regular intervals. Here, the conductive metallic pieces 23 are fixed based on a riveting method by rivets 24 at regular intervals.

In addition, the rear end of the rivet 24, which fixes both ends of the conductive metallic pieces 23, namely, the rivet 24 of the end of the conductive metallic piece neighboring with the inner surface of the handle cover 10 is connected with the connection leading line 31, so that the entire outer surfaces of the handle cover 10 act as the conductive contact member 20.

When the conductive metallic piece 23 is fixed at the handle cover 10, the rivet 24 having a large head is used, so that the convex friction members are provided on the outer surface of the handle cover 10 at regular arrangements, so that the driver may have a finger pressure effect. Since it is possible to obtain a construction like the embedded metallic balls, a good outer look can be achieved.

As shown in FIG. 6, the static electricity prevention apparatus provided at a vehicle handle cover according to a fourth embodiment of the present invention, a conductive contact member is constituted in a sewing method using a conductive thread 25 as a sewing thread when a soft or natural leather is covered when fabricating the handle cover. On end of a leading line 30 having a certain length is connected with the conductive thread 25, and the other end of the same is connected with the grounding piece 4 installed at the fixing shaft of the handle through the leading line connection port 32 and the resistors 35.

As shown in FIG. 7, in the static electricity prevention apparatus provided at a vehicle handle cover according to a fifth embodiment of the present invention, a conductive contact member 20 is constituted in such a manner that a conductive plate 26 is attached along an inner surface of the handle cover 10, and the conductive contact member is fixed based on a riveting method using the rivets 27 at regular intervals.

In addition, one end of the leading line 30 is connected with the conductive plate 26, and the end of the same is connected with the grounding piece 4 installed at the fixing shaft of the handle through the leading line connection port 32 and the resistors 35.

The conductive plate 26 is constituted using the rivet 27 having a large head when fixing at the handle cover 10, so that a convex friction member is provided at an outer surface of the handle cover 10 at regular intervals, whereby a finger pressure effect can be obtained. The construction is configured like a metallic ball-embedded structure, so that a good outer look can be obtained.

The operation of the present invention will be described with reference to FIGS. 1 through 8.

In the static electricity prevention apparatus provided at a vehicle handle cover according to the present invention, in a state that a driver sits at the seat of the vehicle, when the driver holds the handle cover 10 covered on the handle 1, the driver's hand naturally touches the conductive contact member 20 of the handle cover 10, so that the static electricity accumulated in the human body is transferred to the vehicle body through the conductive contact member 20 of the handle cover 20, the leading line 30, and the grounding portion of the handle 1.

In addition, in the case that the driver sits at the seat for a long time, the static electricity occurring due to a friction between the seat and the driver's clothes is transferred from the higher electric charge portion to the lower electric charge portion, so that the electric charge difference becomes same, for thereby preventing a static electricity shock.

Holding the handle, when the drivers gets off the vehicle, the static electricity is transferred from the higher static electricity to the lower static electricity, so that the static electricity shock occurring when the driver opens or close the door can be prevented.

INDUSTRIAL APPLICABILITY

In the static electricity prevention apparatus provided at a vehicle handle cover according to the present invention, the static electricity occurring when the driver gets on or off the vehicle is transferred to the vehicle body through the handle cover having a conductive contact member, so that it is possible to prevent a shock phenomenon occurring when touching with others or objects due to the static electricity increased in the human body.

In addition, in the present invention, it is possible to prevent a uncomfortable feeling and a dangerous feeling of the occurrence of the static electricity which occurs due to the electric charge accumulated in the human body in such a manner that the static electricity occurring due to a friction between the driver's seat and the driver's clothes when the driver gets on or off the vehicle.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. In a static electricity prevention apparatus of a vehicle, a static electricity prevention apparatus provided at a vehicle handle cover, comprising:
   a conductive contact means which is provided at a handle cover;
   a leading line which is provided at the conductive contact means; and
   a second leading line of which one end is connected through a leading line connection port provided at a front end of the leading line, and the other end is provided with a grounding piece which is connected with a fixing shaft of the handle, so that a shock phenomenon occurring an instant discharge of the static electricity accumulated in a driver's body can be prevented.

2. The apparatus of claim 1, wherein said conductive contact means includes a plurality of through holes provided at an edge portion of both ends of the handle cover, and a conductive strap engaged through the through holes.

3. The apparatus of claim 1, wherein said conductive contact means is constituted in such a manner that a conductive tape is sewed in which a conductive metallic thread is woven along an edge portion of both ends of the handle cover.

4. The apparatus of claim 1, wherein said conductive contact means in constituted in such a manner that a conductive metallic piece fixed based on a riveting method is arranged along an outer surface of the handle cover at regular intervals, and a rivet of both ends of the conductive metallic piece neighboring with the inner surface of the handle cover is connected by the connection leading line.

5. The apparatus of claim 1, wherein said conductive contact means is made of a conductive sewing thread when a soft or natural leather is covered when fabricating the handle, and the conductive thread is connected with a leading line.

6. The apparatus of claim 1, wherein said conducting contact means is fixed based on a riveting method based on a rivet at regular intervals as a conductive plate is attached along an inner surface of the handle cover.

7. The apparatus of one among claims 1 through 6, wherein said leading line or said second leading line is provided with resistors.

* * * * *